(12) United States Patent
Remmert et al.

(10) Patent No.: US 7,569,770 B2
(45) Date of Patent: Aug. 4, 2009

(54) EXTENSION ASSEMBLY AND ENCLOSURE EMPLOYING THE SAME

(75) Inventors: Scot E. Remmert, Mt. Pulaski, IL (US); Matthew D. Occhipinti, East Peoria, IL (US)

(73) Assignee: Eaton Corporation, Cleveland, OH (US)

( * ) Notice: Subject to any disclaimer, the term of this patent is extended or adjusted under 35 U.S.C. 154(b) by 511 days.

(21) Appl. No.: 11/536,063

(22) Filed: Sep. 28, 2006

(65) Prior Publication Data

US 2008/0078133 A1   Apr. 3, 2008

(51) Int. Cl.
*H01J 5/00* (2006.01)

(52) U.S. Cl. ............... 174/50; 174/58; 174/60; 220/4.02; 439/535

(58) Field of Classification Search ........ 174/50, 174/58–60, 17 R; 439/535; 248/906; 220/4.02, 220/3.3; 52/3, 23
See application file for complete search history.

(56) References Cited

U.S. PATENT DOCUMENTS

| | | |
|---|---|---|
| 4,783,718 A | 11/1988 | Raabe et al. |
| 5,638,256 A | 6/1997 | Leach et al. |
| 5,745,337 A | 4/1998 | Reiner |
| 6,005,188 A * | 12/1999 | Teichler et al. ............... 174/50 |
| 6,421,229 B1 | 7/2002 | Campbell et al. |
| 6,570,754 B2 | 5/2003 | Foley et al. |
| 6,700,060 B1 | 3/2004 | Johnson |
| 6,879,483 B2 | 4/2005 | Johnson et al. |
| 2006/0028789 A1 | 2/2006 | Remmert et al. |

OTHER PUBLICATIONS

U.S. Appl. No. 10/913,210, Scot E. Remmert et al.
U.S. Appl. No. 11/263,436, Jeffrey L. Johnson et al.

* cited by examiner

*Primary Examiner*—Dhiru R Patel
(74) *Attorney, Agent, or Firm*—Martin J. Moran

(57) ABSTRACT

An extension assembly is provided for an enclosure coupled to a structure, such as a building wall. The enclosure includes a panel member, a plurality of sides extending outwardly from the panel member to define an interior having a depth and forming an opening for accessing the interior, and a cover. The extension assembly includes at least one extension member coupled to at least one of the sides of the enclosure, and having a depth, and an adapter collar. The adapter collar overlays the extension member(s) and includes a flange portion engaging the exterior surface of the wall, and an aperture extending through the flange portion. The flange portion receives the cover of the enclosure, in order to provide access to the interior of the enclosure through the aperture of the flange portion. The extension assembly increases the depth of the enclosure by the depth of the extension member(s).

12 Claims, 6 Drawing Sheets

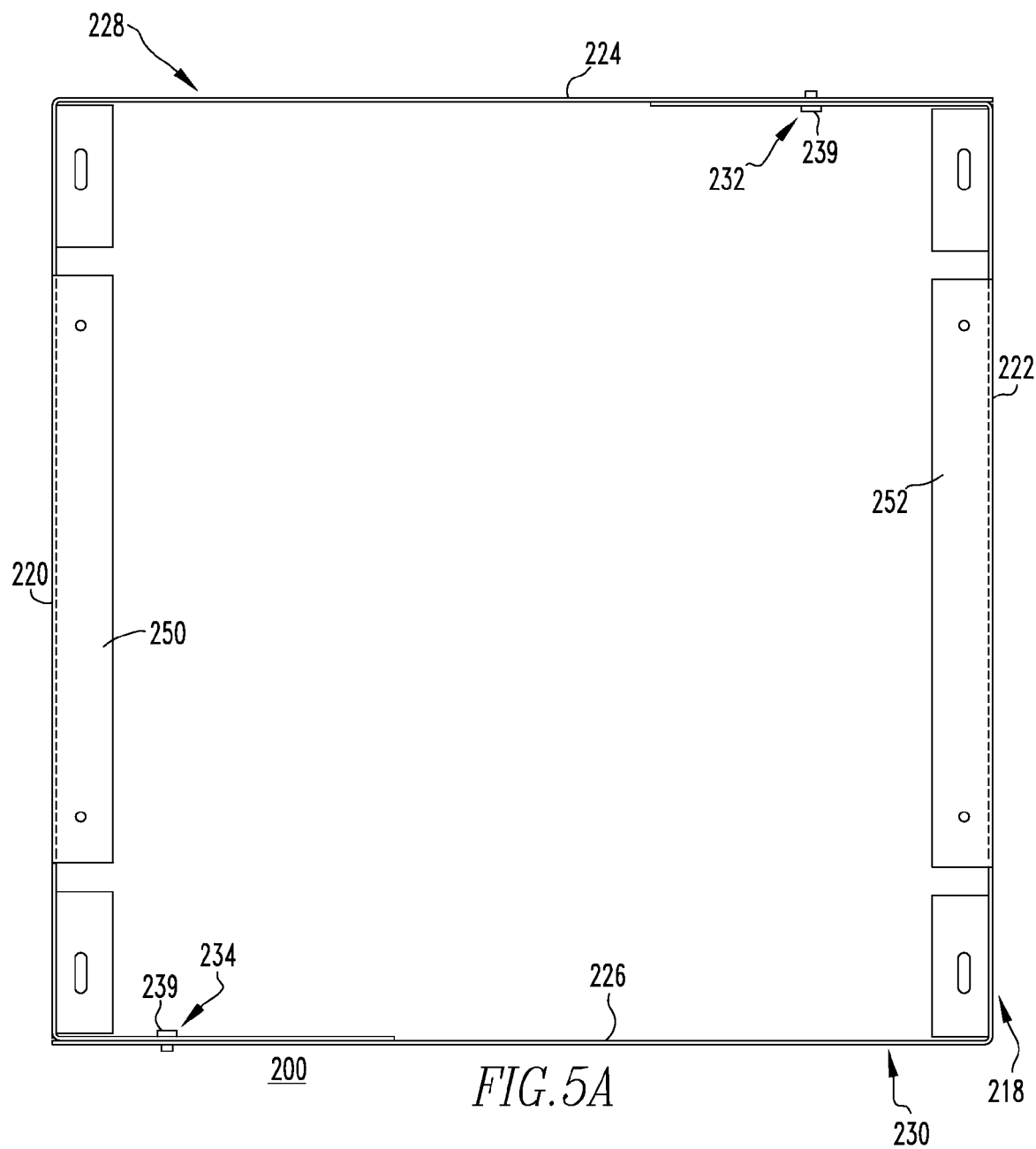
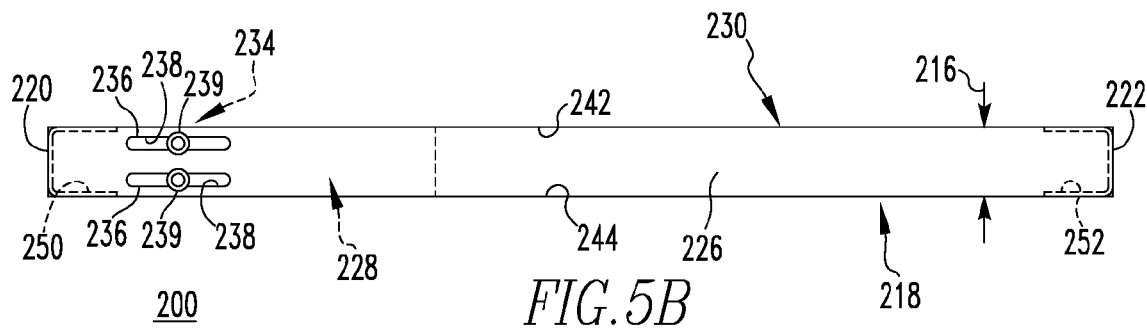
FIG.5A
FIG.5B

EXTENSION ASSEMBLY AND ENCLOSURE EMPLOYING THE SAME

BACKGROUND OF THE INVENTION

1. Field of the Invention

The invention relates generally to enclosures and, more particularly, to an extension assembly for increasing the depth of an enclosure, such as for example, an electrical enclosure. The invention also relates to enclosures employing extension assemblies.

2. Background Information

Buildings, such as for example, commercial buildings and residences, typically have an electrical distribution center with one or more enclosures, such as for example, boxes or cabinets, which house electrical equipment (e.g., without limitation, relays; circuit breakers; meters; transformers).

For example, FIG. 1 shows an electrical enclosure 2 (e.g., without limitation, a panel board; a control center; a load center) which collectively houses the circuit breakers 22 for branch circuits (not shown) at a site served by an electric power distribution system (not shown). The electrical enclosure 2 includes a housing 4 which is recessed to be substantially flush with a wall surface 6. A trim assembly 8 is mounted on the front of the housing 4 by a picture frame structure 10. The trim assembly 8 includes a trim piece 12 which supports a hinged door 14 and a dead front 16. The dead front 16 is accessible when the hinged door 14 is open, as shown, and includes openings 18,20 through which portions of the branch circuit breakers 22 and a main circuit breaker 24 protrude.

In replacing or updating electrical service infrastructure provided by older electrical enclosures (e.g., enclosure 2), it has been discovered that the physical size of the new or different electrical equipment to be installed is sometimes different than the prior equipment but that the enclosures are otherwise still adequate. It is, therefore, desirable to continue to use the same enclosure and, rather than replacing it, retrofit it with a new interior and circuit breakers. This is particularly true, for example, in the case of recessed panel boards where costly repairs would probably be required to remove and replace the panel board. Retrofitting old enclosures with new interiors and circuit breakers has traditionally required, for example, shimming up the replacement interior or fabricating new risers to bring new smaller circuit breakers into registry with the dead fronts of the enclosures. The latter practice requires the contractor to supply measurements of the existing enclosure, which are often not accurate and/or not timely provided.

One prior proposal for attempting to overcome the foregoing disadvantages with respect to retrofitting and updating existing electrical enclosures has been to provide an adjustable riser assembly 26 like the one shown in FIG. 2. The riser assembly 26 can be adjusted in the field in height and/or in depth in the directions indicated by arrows 28,30, respectively, in order to retrofit the enclosure 2 with a replacement or expanded interior 32. Adjustable riser assemblies are discussed in greater detail, for example, in U.S. Patent Application Publication No. 2006/0028789 entitled "Adjustable Riser and Panel Board Incorporating Same," filed Aug. 6, 2004, which is hereby incorporated herein by reference.

Although adjustable riser assemblies have solved some of the issues concerning size and depth of electrical enclosures, additional problems remain. Among them is the fact that there traditionally has been no recourse if the electrical enclosure was too shallow for the intended application. Specifically, some relatively new electrical components such as, for example, circuit breakers are designed to have a relatively thin and long structure in order to fit increased numbers of breakers beside one another within the same amount of space. Where the depth of such components is greater than the depth of the electrical enclosure such that the enclosure was not deep enough to accommodate them, there has been no known suitable solution other than to completely remove and replace the enclosure.

Additionally, with regard to new electrical enclosures, it is desirable to minimize the amount of variation from electrical enclosure to electrical enclosure during manufacture. In other words, rather than custom designing each enclosure to meet a precise depth specification, which is cost-intensive, it would be more efficient to manufacture a universal enclosure and a mechanism which can be used with such universal enclosure to adapt (e.g., without limitation, add depth) it, as necessary, in order to provide the desired depth for the particular application at hand.

There is a need, therefore, for a mechanism to add depth, as necessary, to new and existing enclosures.

There is, therefore, room for improvement in enclosures, such as, for example, electrical enclosures.

SUMMARY OF THE INVENTION

These needs and others are met by embodiments of the invention, which are directed to an extension assembly for enclosures such as, for example, electrical enclosures for a power distribution system.

As one aspect of the invention, an extension assembly is provided for an enclosure. The enclosure includes a panel member, a plurality of sides extending outwardly from the panel member to define an interior and to form an opening for providing access to the interior, and a cover. The cover has a closed position corresponding to the cover overlaying the opening, and an open position corresponding to the interior of the enclosure being accessible through the opening. The interior of the enclosure has a depth being the distance between the panel member and the cover. The extension assembly comprises: an adapter collar structured to be coupled to the enclosure between the cover of the enclosure and the sides of the enclosure in order to increase the depth of the enclosure. The adapter collar includes a flange portion and an aperture extending through the flange portion. The flange portion of the adapter collar is structured to receive the cover of the enclosure, in order to provide access to the interior of the enclosure through the aperture of the flange portion of the adapter collar when the cover is disposed in the open position.

The flange portion of the adapter collar may comprise a generally planar portion having a plurality of edge flanges structured to extend a predetermined distance, generally perpendicularly outwardly from the generally planar portion of the adapter collar, and toward the enclosure. When the adapter collar is coupled to the enclosure, the extension assembly may increase the depth of the enclosure by at least the predetermined distance of the edge flanges of the adapter collar.

As another aspect of the invention, an extension assembly is provided for an enclosure which is coupled to a structure. The enclosure includes a panel member coupled to the structure, a plurality of sides extending outwardly from the panel member to define an interior and to form an opening for providing access to the interior, and a cover. The interior of the enclosure has a depth. The extension assembly comprises: at least one extension member structured to be coupled to at least one of the sides of the enclosure, such extension member having a depth; and an adapter collar structured to overlay such extension member. The adapter collar includes a flange portion structured to engage the structure, and an aperture extending through the flange portion. The flange portion of the adapter collar is structured to receive the cover of the enclosure, in order to provide access to the interior of the enclosure through the aperture of the flange portion. The extension assembly increases the depth of the enclosure by the depth of such extension member.

The panel member of the enclosure may be a back panel, and the sides of the enclosure may comprise first and second side walls, a top end, and a bottom end, wherein the extension member comprises a frame including first and second sides structured to align with the first and second side walls of the enclosure, a top structured to align with the top end of the enclosure, and a bottom structured to align with the bottom end of the enclosure. The frame may comprise a first part and a second part, wherein the first part of the frame generally comprises the first side of the frame and the top of the frame, wherein the second part of the frame generally comprises the second side of the frame and the bottom of the frame, and wherein the frame further comprises at least one adjustment mechanism structured to provide adjustment of the first part of the frame and the second part of the frame with respect to one another and with respect to the sides of the enclosure. The depth of the extension member may be about 1 inch.

The flange portion of the adapter collar may comprise a generally planar portion having a plurality of edge flanges which extend generally perpendicularly outwardly from the generally planar portion of the adapter collar, and toward the structure on which the enclosure is mounted. The generally planar portion of the flange portion of the adapter collar may be spaced from the structure, thereby creating a gap therebetween, and the edge flanges of the flange portion of the adapter collar may engage the structure, thereby closing the gap.

As a further aspect of the invention, an enclosure, which is coupled to a structure, comprises: a panel member; a plurality of sides extending outwardly from the panel member to define an interior of the enclosure and to form an opening for accessing the interior of the enclosure, the interior having a depth; a cover for covering the opening of the enclosure; and an extension assembly comprising: at least one extension member coupled to at least one of the sides of the enclosure, such extension member having a depth, and an adapter collar structured to overlay such extension member. The adapter collar includes a flange portion engaging the structure, and an aperture extending through the flange portion. The flange portion of the adapter collar receives the cover of the enclosure, in order to provide access to the interior of the enclosure through the aperture of the flange portion. The extension assembly increases the depth of the enclosure by the depth of such extension member.

The enclosure may be an electrical enclosure, and the structure may be a wall of a building. The wall may include a prepared opening structured to receive a portion of the electrical enclosure, and an exterior surface adjacent the prepared opening. The extension assembly may increase the depth of the electrical enclosure with respect to the exterior surface of the wall in order that the cover of the electrical enclosure is spaced from the exterior surface of the wall, thereby forming a gap therebetween. The adapter collar may comprise a trim member structured to extend towards and engage the exterior surface of the wall, thereby substantially filling the gap.

BRIEF DESCRIPTION OF THE DRAWINGS

A full understanding of the invention can be gained from the following description of the preferred embodiments when read in conjunction with the accompanying drawings in which:

FIGS. 5A and 5B are vertical elevation and bottom plan views, respectively, of a portion of the extension assembly of FIG. 4.

DESCRIPTION OF THE PREFERRED EMBODIMENTS

Figure 1:
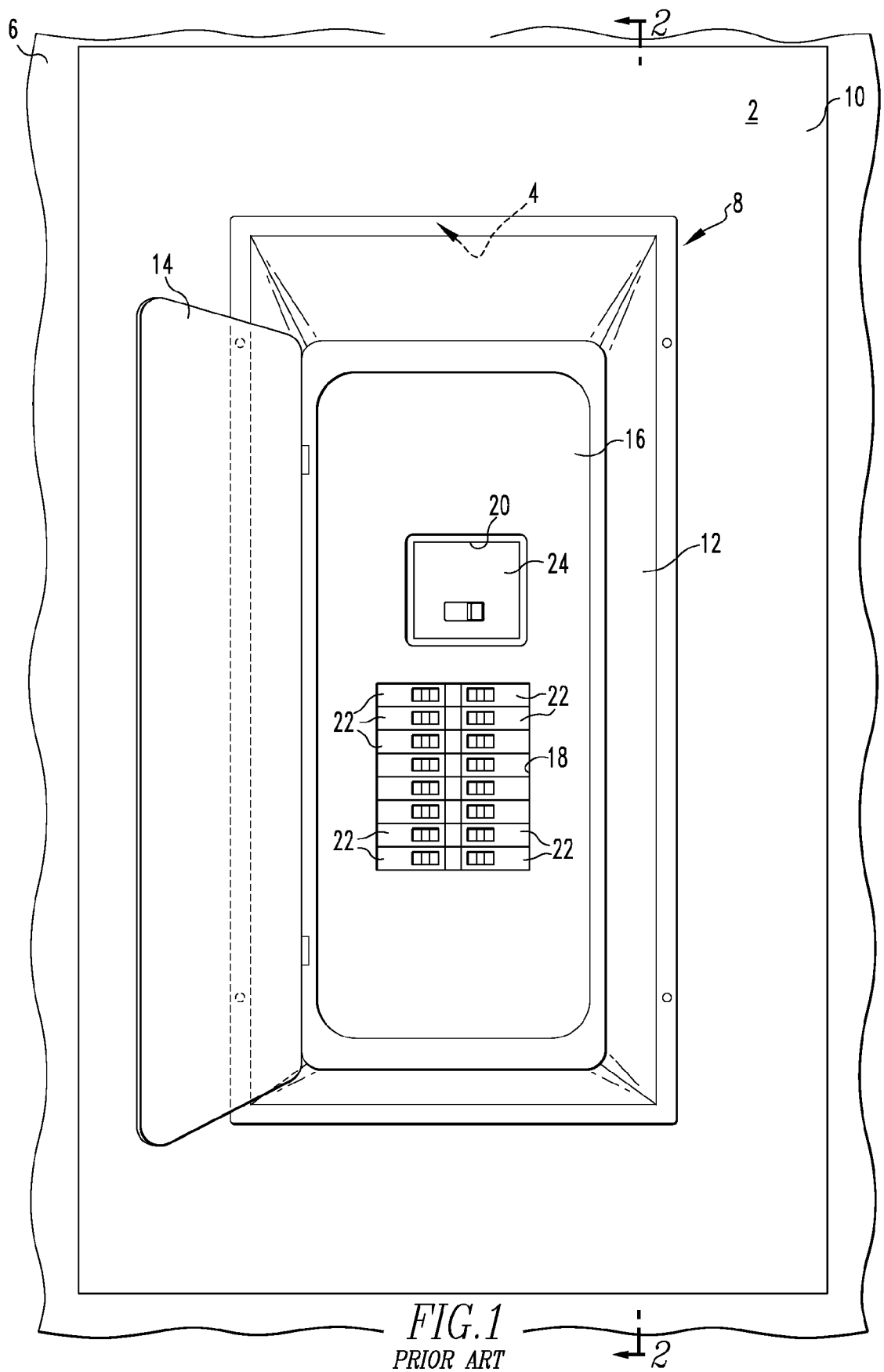
FIG. 1 is a front elevational view of a panel board.
Figure 2:
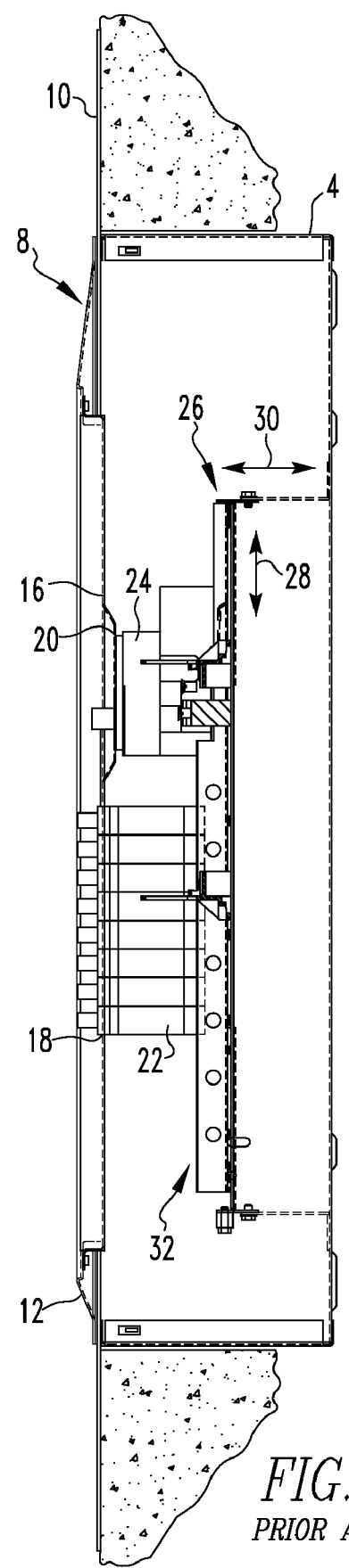
FIG. 2 is a vertical section along line 2-2 of FIG. 1.

For purposes of illustration, embodiments of the invention will be described as applied to an extension assembly for enclosures housing electrical equipment (e.g., without limitation, relays; circuit breakers; electric meters; transformers), at least one of the enclosures being adapted for mounting within a structure, such as for example, the wall of a building. However, it will become apparent that they could also be applied to other types of enclosures adapted for one or both of indoor and outdoor (i.e., weather-resistant) use and/or for mounting locations other than within the wall of a building.

Directional phrases used herein, such as, for example, top, bottom, upper, lower and derivatives thereof, relate to the orientation of the elements shown in the drawings and are not limiting upon the claims unless expressly recited therein.

As employed herein, the term "adjustment" refers to movement of one component with respect to another component to which it is coupled and expressly includes, but is not limited to, pivoting and translation of the components with respect to one another. For example, the disclosed extension assembly is adjustable with respect to the remainder of the enclosure, in order to accommodate various mounting conditions and thus provide an optimized installation within, for example and without limitation, the wall of a residence or other structure.

As employed herein, the term "residence" shall expressly include, but is not limited to, a home, apartment, dwelling, office and/or place where a person or persons reside(s) and/or work(s).

As employed herein, the term "structure" shall expressly include, but is not limited to, a home, apartment, dwelling, garage, office building, commercial building, industrial building, roofed and/or walled structure built for permanent or temporary use, structure for a land vehicle, structure for a marine vehicle, structure for an air vehicle, or structure for another motor vehicle.

As employed herein, the term "land vehicle" shall expressly include, but is not limited to, any land-based vehicles having pneumatic tires, any rail-based vehicles, any maglev vehicles, automobiles, cars, trucks, station wagons, sport-utility vehicles (SUVs), recreational vehicles, all-terrain vehicles, vans, buses, motorcycles, mopeds, campers, trailers, or bicycles.

As employed herein, the term "marine vehicle" shall expressly include, but is not limited to, any water-based vehicles, ships, boats, other vessels for travel on water, submarines, or other vessels for travel under water.

As employed herein, the term "air vehicle" shall expressly include, but is not limited to, any air-based vehicles, airplanes, jets, aircraft, airships, balloons, blimps, or dirigibles.

As employed herein, the term "fastener" refers to any suitable connecting or tightening mechanism expressly including, but not limited to, screws, bolts (e.g., without limitation, carriage bolts) and the combinations of bolts and nuts (e.g., without limitation, lock nuts and wing nuts) and bolts, washers and nuts.

As employed herein, the statement that two or more parts are "coupled" together shall mean that the parts are joined together either directly or joined through one or more intermediate parts.

As employed herein, the term "number" shall mean one or more than one (i.e., a plurality).

Figure 3:
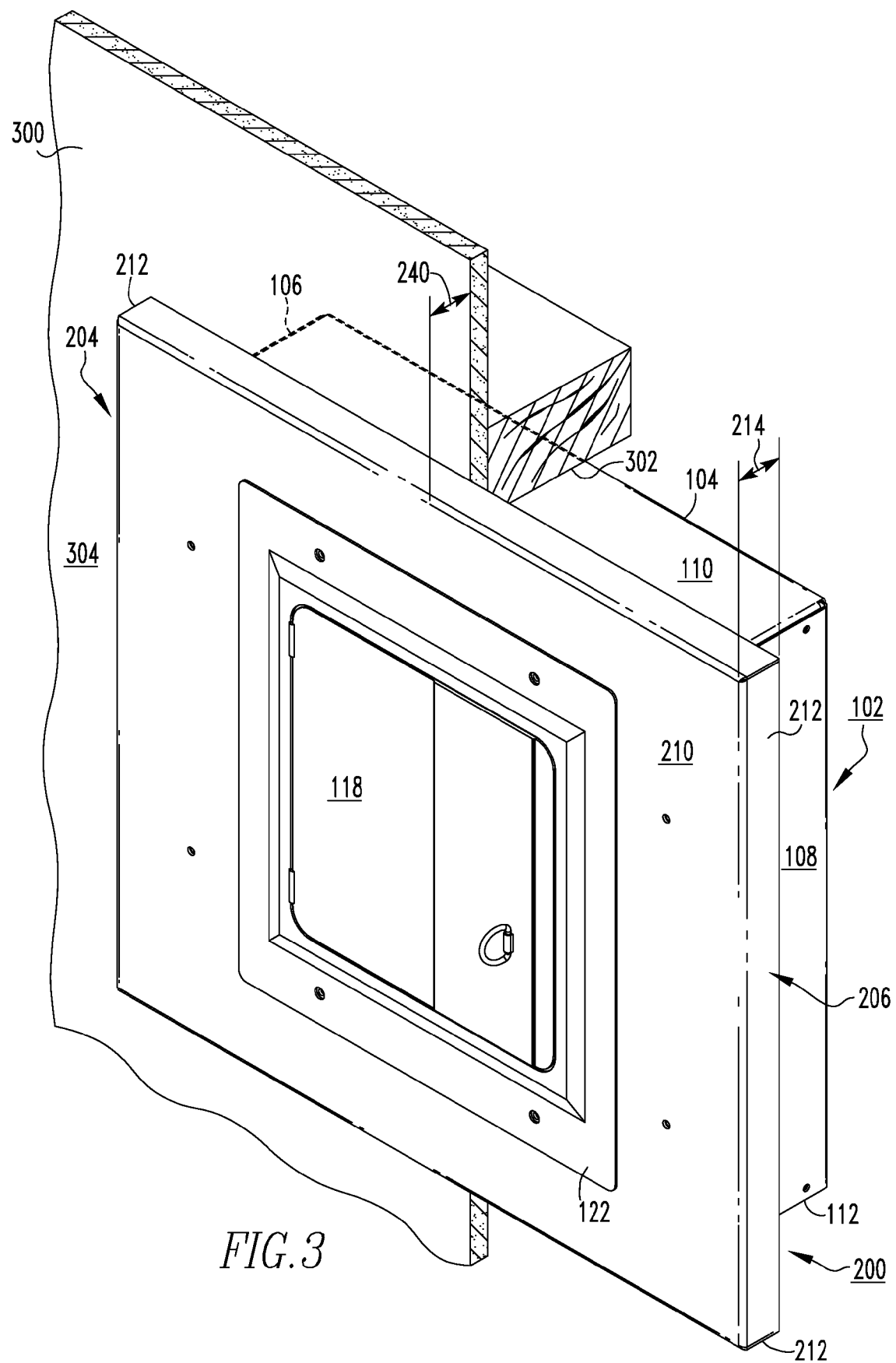
FIG. 3 is an isometric view of an electrical enclosure and an extension assembly therefor, in accordance with an embodiment of the invention.
Figure 4:
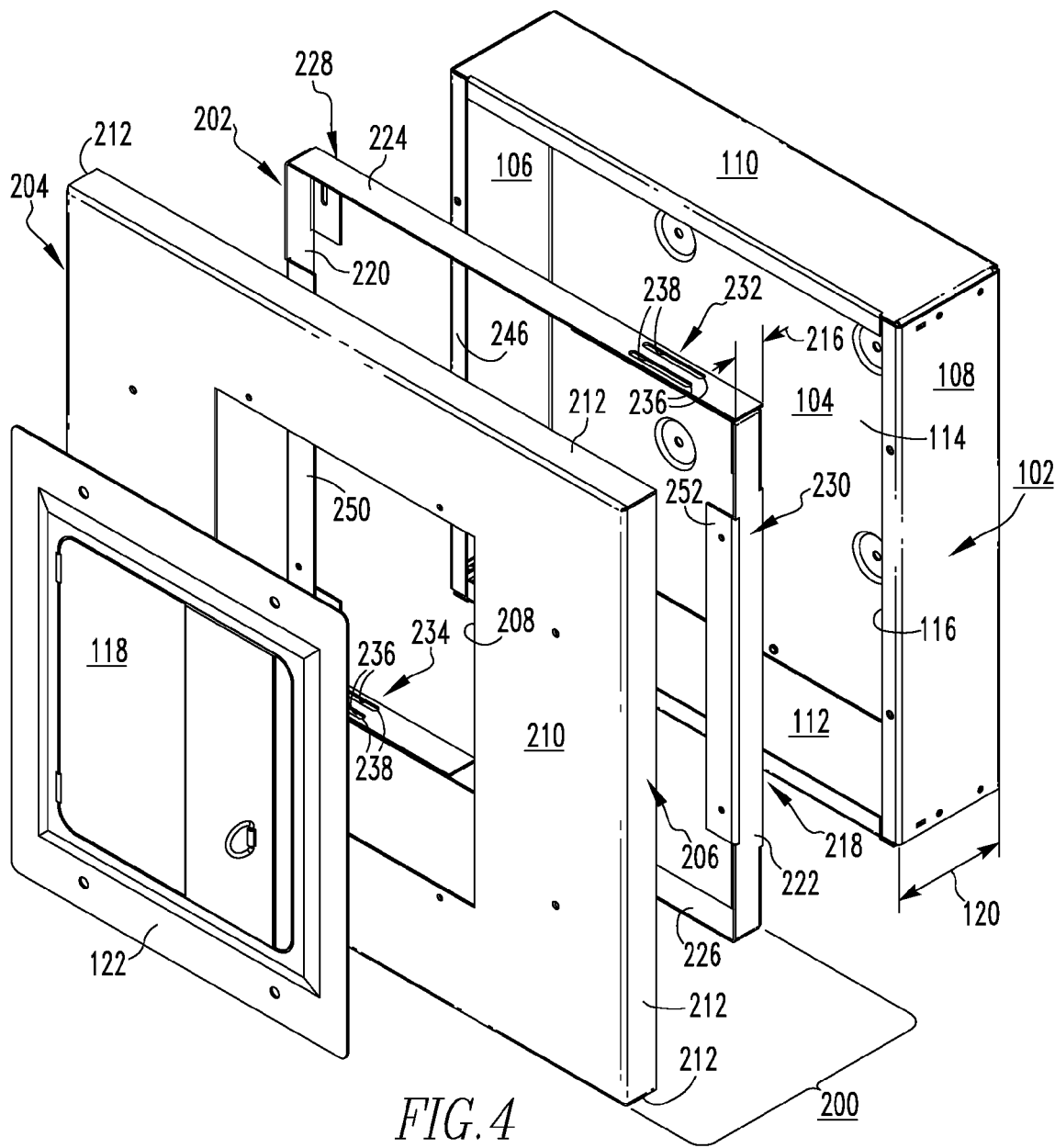
FIG. 4 is an exploded isometric view of the electrical enclosure and extension assembly therefor, of FIG. 3.

FIG. 3 shows an extension assembly 200 for an enclosure 102 which is coupled to a structure such as, for example and without limitation, a building wall 300 (partially shown). The enclosure 102 of FIG. 3 is an electrical enclosure 102 including a panel member 104, a plurality of sides 106,108,110,112 extending outwardly from the panel member 104 to define an interior 114 (FIG. 4) of the enclosure 102, and to form an opening 116 (FIG. 4) for accessing the interior 114 (FIG. 4). Prior to the extension assembly 200 being employed with the electrical enclosure 102, the depth 120 of the interior 114 of the enclosure 102 is the distance between the panel member 104 and the cover 118 of the enclosure 102 which, as shown in FIG. 4, is substantially equivalent to the distance that the sides 106,108,110,112 of the enclosure 102 extend from the back panel 104 thereof.

In the example of FIG. 3, the wall 300 includes a prepared opening 302 structured to receive a portion of the electrical enclosure 102, and an exterior surface 304 adjacent to the prepared opening 302. The extension assembly 200 increases the depth 120 (FIG. 4) of the electrical enclosure 102 with respect to the exterior surface 304 of the wall 300, in order that the cover 118 of the electrical enclosure 102 is spaced from such surface 304, thereby forming a gap 240 therebetween. The extension assembly 200 includes an adapter collar 204 structured to be coupled to the electrical enclosure 102 between the cover 118 and the sides 106,108,110,112 thereof, and to extend towards and engage exterior surface 304 of the wall 300 to substantially fill such gap 240. In this manner, the gap or distance 240 is substantially closed in order to prevent the undesired entry of matter, such as debris and moisture (i.e., where the electrical enclosure 102 is employed outdoors), and further serves a safety function to resist undesired access to, for example, live electrical components (not shown) housed within the interior 114 (FIG. 4) of the electrical enclosure 102. The adapter collar 204 also serves an aesthetical function to improve the appearance of the electrical enclosure 102 by blending the disposed portion (i.e., the portion of the electrical enclosure 102 disposed outside of the prepared opening 302 of wall 300) of the electrical enclosure 102 into the exterior surface 304 of the wall 300, thereby improving the appearance of the extended electrical enclosure 102. In this regard, the adapter collar functions as a trim member 204. It will be appreciated that the electrical enclosure 102 and extension assembly 200 thereof could alternatively be coupled to any known or suitable structure other than the prepared opening 302 of the building wall 300, shown and described herein.

Continuing to refer to FIG. 3 and also to FIG. 4, the adapter collar 204 includes a flange portion 206 and an aperture 208 (FIG. 4) which extends therethrough. The flange portion 206 is structured to receive the cover 118 of the electrical enclosure 102, in order to provide access to the interior 114 (FIG. 4) of the electrical enclosure 102 through such aperture 208, when such cover 118 is opened or removed. The example cover 118, shown and described herein, is a hinged door 118 which is pivotably coupled to a trim flange 122. The trim flange 122 is, in turn, coupled to the flange portion 206 of the adapter collar 204. The hinged door 118 is operable between an open position (not shown) for providing access to the interior 114 (FIG. 4) of the enclosure 102 through the aforementioned aperture 208 (FIG. 4), and a closed position (shown) in which the hinged door 118 covers the aperture 208 (FIG. 4).

The flange portion 206 of the adapter collar 204 comprises a generally planar portion 210 having a plurality of edge flanges 212. The edge flanges 212 extend a predetermined distance 214 (FIG. 3), generally perpendicularly outwardly from the generally planar portion 210 of the adapter collar 204, in toward the electrical enclosure 102, as shown. As previously discussed, the adapter collar 204 engages the exterior surface 304 of the wall 300. Accordingly, it will be appreciated that the adapter collar 204 can be employed independently to provide the desired extension function to increase the depth 120 (FIG. 4) of the enclosure 102 by at least the predetermined distance 214 (FIG. 3) of the edge flanges 212 of the adapter collar 204.

Continuing to refer to FIG. 4, the extension assembly 200 preferably further includes at least one extension member 202 structured to be coupled to at least one of the sides 106,108, 110,112 of the electrical enclosure 102. The extension member 202 has a depth 216 which increases the depth 120 of the electrical enclosure 102, accordingly by such depth 216. One extension member 202 is shown in the example of FIG. 4, although it will be appreciated that any suitable number of extension members, such as, for example and without limitation, the pair of extension members 202,202' shown in the extension assembly 200' of FIG. 6, could be employed to increase the depth 120 of the enclosure 102 by the desired amount. It will also be appreciated that while the depth 216 of the extension members 202,202' (FIG. 6) are contemplated as being about 1 inch, that they could alternatively be made to have any known or suitable alternative depth dimension, without departing from the scope of the invention. It will still further be appreciated that although the extension members 202,202' (FIG. 6) are contemplated as being identical, in order to provide one universal extension component which can be employed in any desired quantity to increase the depth 120 of the electrical enclosure 102, as desired, the extension members 202,202' (FIG. 6) could have depths 216,216' (FIG. 6) which are different. Regardless of the number of extension members 202,202' (FIG. 6) which are employed, the adapter collar 204 of the extension assembly 200 is structured to overlay the extension members (e.g., 202,202' (FIG. 6)), and close any gap 240 (FIG. 3) between the wall 300 (FIG. 3) and cover 118 of the electrical enclosure 102 which may result therefrom, as previously described. Accordingly, it will be appreciated that an adapter collar (not shown) having any suitable depth, as necessary to close the gap (e.g., 240) between the wall 300 and the cover 118, could be employed.

The extension member 202 in the example of FIG. 4 (see also extension member 202' of FIG. 6, which is substantially identical and is numbered similarly to extension member 202, but including prime symbols, such as 202', 218', 220', 222', etc.) comprises a frame 218 including first and second sides 220,222 which are structured to align with the first and second side walls 106,108 of the electrical enclosure 102, a top 224 structured to align with the top end 110 of the electrical enclosure 102, and a bottom 226 structured to align with the bottom end 112 of the electrical enclosure 102.

Figure 6:
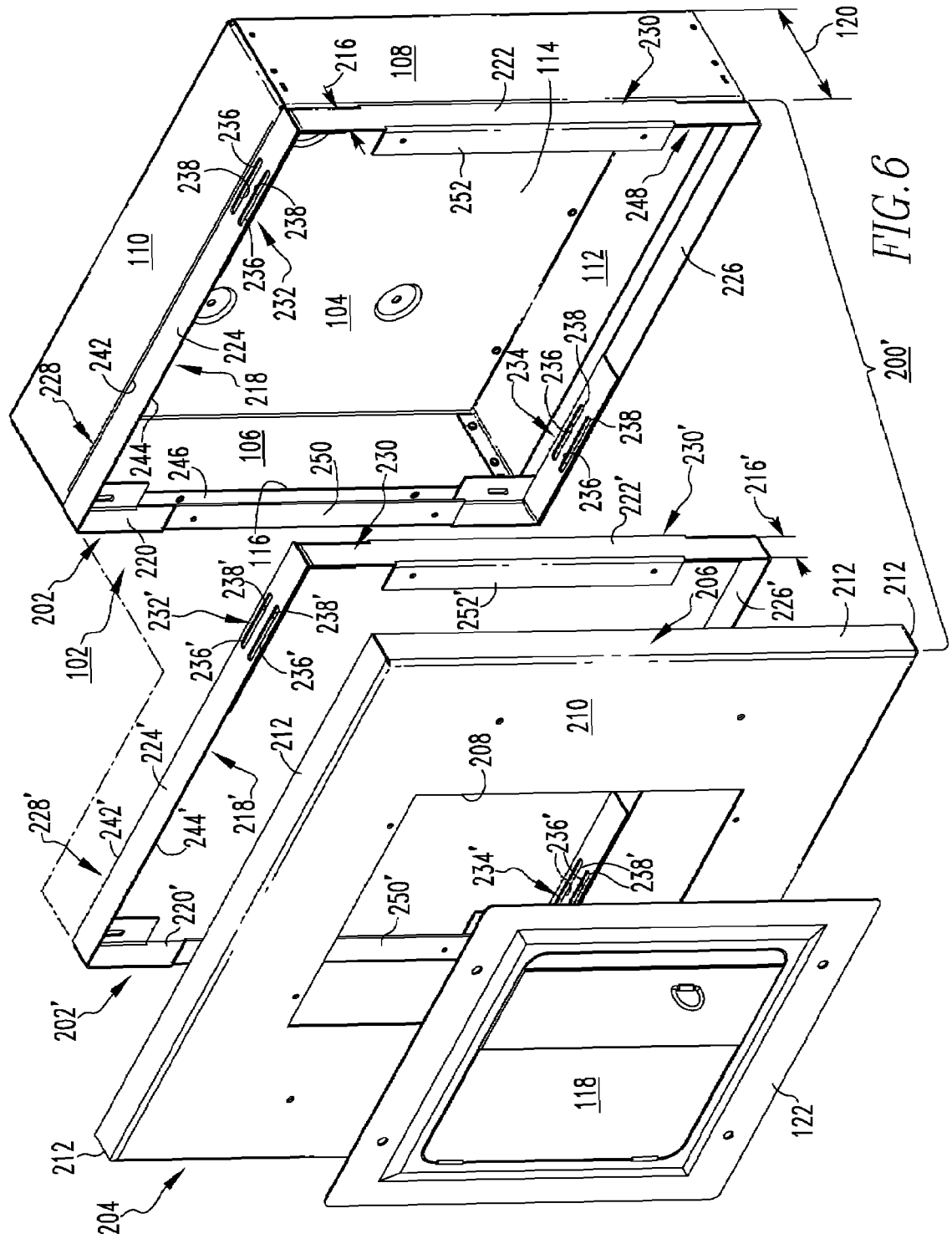
FIG. 6 is an exploded isometric view of an electrical enclosure employing a pair of extension assemblies, in accordance with another embodiment of the invention.

FIGS. 5A and 5B show the extension member 200 in greater detail. As previously noted, it will be appreciated that extension member 202' of FIG. 6 is substantially identical and similarly numbered but with prime symbols (e.g., without limitation, 218'). Specifically, the frame 218 of the extension member 202 includes a first part 228 and a second part 230 which are adjustable with respect to one another. The first part 228 of the frame 218 generally comprises a first side 220 and the top 224 of the frame 218, and the second part 230 of the frame 218 generally comprises a second side 222 and the bottom 226 of the frame 218. Adjustment of the first and second parts 228,230 of the frame 218 both with respect to one another, and with respect to the sides 106,108,110,120 of the electrical enclosure 102 (FIGS. 3, 4 and 6), is provided by at least one adjustment mechanism 232,234 (two are shown in FIG. 5A). The adjustment mechanisms 232,234 of the example frame member 218 comprise a plurality of slots 236,238 and a number of fasteners 239 received therethrough.

Specifically, as shown in FIGS. 4, 5A and 5B, the slots include a number of first elongated slots 236 disposed on at least one portion of the first part 228 of the frame 218 of the extension member 202, and a number of second elongated slots 238 disposed on a corresponding at least one portion of the second part 230 of the frame 218. In the example shown and described herein, a pair of first elongated slots 236 are disposed laterally through the right hand side (from the perspective of FIG. 4) of top 224 of the frame 218, and a corresponding pair of second elongated slots 238 extend laterally therebeneath through the second part 230 of the frame 218. A second set of first and second slots 236,238 is disposed in the opposite (i.e., lower left hand corner (from the perspective of FIG. 4)) of the frame 218. Fasteners 239 are inserted through each pair of slots 236,238, as shown in FIGS. 5A and 5B, and are tightened once the desired adjustment of the frame 218 has been achieved. In this manner, the lateral width of the frame 218 can be adjusted for a proper alignment with the sides 106,108,110,112 of the electrical enclosure 102. It will, however, be appreciated that any known or suitable alternative or additional arrangement of slots (not shown) or other suitable adjustment mechanism, such as a plurality of apertures (not shown) could be employed on the frame 218 to provide adjustment in a variety of other or additional directions (e.g., without limitation, vertical adjustment; lateral adjustment; a combination of vertical, depth, and lateral adjustment), without departing from the scope of the invention. It will further be appreciated that any known or suitable fastener other than the screws 239 (FIGS. 5A and 5B) shown and described herein, could be employed.

FIG. 6 shows an electrical enclosure 102 having an extension assembly 200' with two extension members 202,202'. The first extension member 202 is attached to the sides 106, 108,110,112 of the electrical enclosure 102 and the second extension member 202' is disposed between the first extension member 202 and the adapter collar 204 and cover 118 thereof. Specifically, the frames 218,218' of the extension members 202,202' include inner edges 242,242' and outer edges 244,244' generally opposite and distal from the first edges 242,242', respectively. The first and second side walls 106,108 of the electrical enclosure 102 include respective first attachment flanges 246,248 (FIG. 3) structured to receive the inner edge 242 of the first and second sides 220,222 of the frame 218 of the first extension member 202,202'. The outer edge 244 of the first and second sides 220,222 of the frame 218 of first extension member 202 includes second attachment flanges 250,252 for receiving the inner edge 242' of second extension member 202', and the first and second sides 220',222' of the outer edge 244' of the frame 218' of second extension member 202' includes second attachment flanges 250',252' receiving the flange portion 206 of the adapter collar 204, as shown. Thus, the depth of the enclosure 102 is increased by the depths 216,216' of the extension members 202,202'. Any known or suitable fastener or fastening mechanism (not expressly shown), as defined herein, can be employed to secure this assembly together. It will be appreciated that any known or suitable alternative flange arrangement or other attachment mechanism and/or configuration could be employed other than the first and second attachment flanges 246,248,250,250',252,252' shown and described herein, without departing from the scope of the invention.

Accordingly, the disclosed extension assemblies 200,200' provide a standard universal set of components (e.g., extension members 202,202'; adapter collar 204) which can be employed retroactively with existing electrical enclosures 102, or alternatively can be implemented with new electrical enclosures, in order to relatively easily and inexpensively increase the depth 120 of the electrical enclosure 102 by being added to the enclosure 102. Furthermore, the adapter collar 204 provides a mechanism for accommodating such increase in depth, without detracting from the visual appearance (i.e., aesthetical appeal) of the electrical enclosure 102.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An extension assembly for an enclosure which is coupled to a structure, said enclosure including a panel member coupled to said enclosure, a plurality of sides extending outwardly from said panel member to define an interior and to form an opening for providing access to said interior, and a cover, said interior of said enclosure having a depth, said extension assembly comprising: at least one extension member structured to be coupled to at least one of the sides of said enclosure, said at least one extension member having a depth; and an adapter collar structured to overlay said at least one extension member, said adapter collar including a flange portion structured to engage said structure, and an aperture extending through said flange portion, wherein said flange portion of said adapter collar is structured to receive said cover of said enclosure, in order to provide access to said interior of said enclosure through said aperture of said flange portion, and wherein said extension assembly increases the depth of said enclosure by the depth of said at least one extension member, wherein said panel member of said enclosure is a back panel; wherein said sides of said enclosure comprise first and second side walls, a top end, and a bottom end; and wherein said at least one extension member comprises a frame including first and second sides structured to align with said first and second side walls of said enclosure, a top structured to align with said top end of said enclosure, and a bottom structured to align with said bottom end of said enclosure, wherein said frame of said at least one extension member comprises a first part and a second part; wherein the first part of said frame generally comprises the first side of said frame and said top of said frame; wherein the second part of said frame generally comprises the second side of said frame and said bottom of said frame; and wherein said frame further comprises at least one adjustment mechanism structured to provide adjustment of the first part of said frame and the second part of said frame with respect to one another and with respect to the sides of said enclosure, wherein said adjustment mechanism comprises a plurality of apertures and a number of fasteners inserted through said apertures; and wherein said apertures comprise a number of first apertures disposed on at least one portion of the first part of said frame of said at least one extension member, and a number of second elongated apertures disposed on a corresponding at least one portion of the second part of said frame of said at least one extension member.

2. The extension assembly of claim 1 wherein the depth of said at least one extension member is about 1 inch.

3. The extension assembly of claim 1 wherein said flange portion of said adapter collar comprises a generally planar portion having a plurality of edge flanges;
wherein said edge flanges extend generally perpendicularly outwardly from said generally planar portion of said adapter collar, and toward said structure on.

4. The extension assembly of claim 3 wherein said generally planar portion of said flange portion of said adapter collar is spaced from said structure, thereby creating a gap therebetween; and wherein said edge flanges of said flange portion of said adapter collar engage said structure, thereby closing said gap.

5. An enclosure coupled to a structure, said enclosure comprising:
a panel member; a plurality of sides extending outwardly from said panel member to define an interior of said enclosure and to form an opening for accessing said interior of said enclosure, said interior having a depth; a cover for covering said opening of said enclosure; and an extension assembly comprising: at least one extension member coupled to at least one of the sides of said enclosure, said at least one extension member having a depth, and an adapter collar structured to overlay said at least one extension member, said adapter collar including a flange portion engaging said structure, and an aperture extending through said flange portion, wherein said flange portion of said adapter collar receives said cover of said enclosure, in order to provide access to said interior of said enclosure through said aperture of said flange portion, and wherein said extension assembly increases the depth of said enclosure by the depth of said at least one extension member, wherein said panel member of said enclosure is a back panel; wherein said sides of said enclosure comprise first and second side walls, a top end, and a bottom end; and wherein said at least one extension member comprises a frame including first and second sides aligned with said first and second side walls of said enclosure, a top aligned with said top end of said enclosure, and a bottom aligned with said bottom end of said enclosure, wherein said frame of said at least one extension member comprises a first part and a second part; wherein the first part of said frame generally comprises the first side of said frame and said top of said frame; wherein the second part of said frame generally comprises the second side of said frame and said bottom of said frame; and wherein said frame further comprises at least one adjustment mechanism structured to provide adjustment of the first part of said frame and the second part of said frame with respect to one another and with respect to the sides of said enclosure, wherein said adjustment mechanism comprises a plurality of apertures and a number of fasteners inserted through said apertures; and wherein said apertures comprises a number of first apertures disposed on at least one portion of the first part of said frame of said at least one extension member, and a number of second elongated apertures disposed on a corresponding at least one portion of the second part of said frame of said at least one extension member.

6. The enclosure of claim 5 wherein the first and second sides of said frame of said at least one extension member further comprise an inner edge structured to engage the sides of said enclosure, and an outer edge generally opposite and distal from said first edge; wherein said first and second side walls of said enclosure each include a first attachment flange structured to receive the inner edge of the first and second sides of said frame of said at least one extension member; and wherein the outer edge of the first and second sides of said frame of said at least one extension member include a second attachment flange for receiving said flange portion of said adapter collar.

7. The enclosure of claim 6 wherein said cover of said enclosure comprises a trim flange coupled to said generally planar portion of said flange portion of said adapter collar.

8. The enclosure of claim 7 wherein said cover is a hinged door pivotably coupled to said trim flange; and wherein said hinged door is operable between an open position for providing access to said interior of said enclosure through said aperture of said flange portion of said adapter collar, and a closed position in which said hinged door covers said aperture of said flange portion of said adapter collar.

9. The enclosure of claim 5 wherein the depth of said at least one extension member is about 1 inch.

10. The enclosure of claim 5 wherein said flange portion of said adapter collar comprises a generally planar portion having a plurality of edge flanges; and wherein said edge flanges extend generally perpendicularly outwardly from said generally planar portion of said flange portion of said adapter collar and toward said structure.

11. The enclosure of claim 10 wherein said generally planar portion of said flange portion of said adapter collar is spaced from said structure, thereby creating a gap therebetween; and wherein said edge flanges of said flange portion of said adapter collar engage said structure, thereby substantially closing said gap.

12. The enclosure of claim 5 wherein said enclosure is an electrical enclosure; wherein said structure is a wall of a building; wherein said wall includes a prepared opening structured to receive a portion of said electrical enclosure, and an exterior surface adjacent said prepared opening; wherein said extension assembly increases the depth of said electrical enclosure with respect to said exterior surface of said wall in order that said cover of said electrical enclosure is spaced from said exterior surface of said wall, thereby forming a gap therebetween; and wherein said adapter collar comprises a trim member structured to extend towards and engage said exterior surface of said wall, thereby substantially filling said gap.

* * * * *